(12) United States Patent
Kontothanassis

(10) Patent No.: US 7,149,807 B1
(45) Date of Patent: Dec. 12, 2006

(54) CONTROL AND COMMUNICATION INFRASTRUCTURE (CCI) FOR SELECTING A TRANSPORT MECHANISM TO TRANSPORT DATA TO ONE OR MORE SERVERS IN A CONTENT DELIVERY NETWORK BASED ON THE SIZE OF THE DATA, TOGETHER WITH FREQUENCY AND LOSS TOLERANCE WITH RESPECT TO TRANSPORT OF THE DATA

(75) Inventor: Leonidas Kontothanassis, Arlington, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 577 days.

(21) Appl. No.: 10/061,983

(22) Filed: Feb. 1, 2002

Related U.S. Application Data

(60) Provisional application No. 60/265,985, filed on Feb. 2, 2001.

(51) Int. Cl.
*G06F 15/16* (2006.01)

(52) U.S. Cl. ............... 709/230; 709/224; 709/227; 709/232; 719/329

(58) Field of Classification Search ............... 709/223, 709/227, 229–232, 224; 714/708; 719/328, 719/329
See application file for complete search history.

(56) References Cited

U.S. PATENT DOCUMENTS 4,941,144 A * 7/1990 Mizukami ............. 714/708
6,006,267 A * 12/1999 Nguyen et al. ......... 709/227
6,650,640 B1 * 11/2003 Muller et al. .......... 370/392
6,785,237 B1 * 8/2004 Sufleta ................. 370/236
6,868,451 B1 * 3/2005 Peacock ............... 709/231
2001/0018711 A1 * 8/2001 Morris ................. 709/229
2005/0003836 A1 * 1/2005 Inoue et al. ........... 455/458

FOREIGN PATENT DOCUMENTS

| JP | 61245638 A | * 10/1986 |
| JP | 2002135264 A | * 5/2002 |
| KR | 2001094593 A | * 11/2001 |

* cited by examiner

*Primary Examiner*—Saleh Najjar
*Assistant Examiner*—Oanh Duong
(74) *Attorney, Agent, or Firm*—David H. Judson

(57) ABSTRACT

A control and communication infrastructure (CCI) for use in a wide area network wherein a plurality of interconnected machines operate a plurality of different applications having varying data transport requirements. Machines within a wide area distributed network agree on a namespace of data objects so that all machines use the same name for a particular data object. Then, machines communicate with one another by publishing and subscribing to data objects in the namespace. The infrastructure selects an optimal transport mechanism from a set of available transport mechanisms based on the data being moved and its frequency and loss tolerance, and then hides the details of how the data is moved from the application using the infrastructure.

13 Claims, 3 Drawing Sheets

CONTROL AND COMMUNICATION INFRASTRUCTURE (CCI) FOR SELECTING A TRANSPORT MECHANISM TO TRANSPORT DATA TO ONE OR MORE SERVERS IN A CONTENT DELIVERY NETWORK BASED ON THE SIZE OF THE DATA, TOGETHER WITH FREQUENCY AND LOSS TOLERANCE WITH RESPECT TO TRANSPORT OF THE DATA

This application is based on and claims priority from Provisional Application No. 60/265,985 filed Feb. 2, 2001.

BACKGROUND OF THE INVENTION

This application contains subject matter that is protected by copyright. All rights are reserved.

1. Technical Field

The present invention relates generally to exporting a uniform application programming interface (API) for a set of underlying transport mechanisms used in a content delivery network (CDN).

2. Description of the Related Art

It is known in the art to delivery HTTP, streaming media and applications over an Internet content delivery network (CDN or ICDN). As is well-known, an ICDN service provider typically operates a plurality of content servers, and sets of servers may be organized as a "region." An ICDN region typically comprises a set of one or more content servers that share a common backend, e.g., a LAN, and that are located at or near an Internet access point. Thus, for example, a typical ICDN region may be colocated within an Internet Service Provider Point of Presence (PoP). A representative ICDN content server is a Pentium-based caching appliance running an operating system (e.g., Linux, Windows NT, Windows 2000) and having suitable RAM and disk storage for ICDN applications and content delivery network content (e.g., Web content, streaming media and applications). The ICDN typically also includes network agents that monitor the network as well as the server loads. Map maker software receives data generated from the network agents and periodically creates maps that dynamically associate IP addresses (e.g., the IP addresses of client-side local name servers) with the ICDN regions. In one type of service offering, requests for content that has been tagged for delivery from the ICDN are directed to the "best" region (preferably using a map-driven DNS request routing mechanism) and to a content server within the region that is not overloaded and that is likely to host the requested content. One such ICDN is provided by Akamai Technologies, Inc. of Cambridge, Mass.

The Internet CDN may also provide live and on-demand streaming media. A live stream is typically captured and encoded by a content provider and sent to an entry point server in the CDN. The stream is delivered from the entry point to the multiple edge servers, which in turn serve the content to the requesting end users. The delivery of media packets from the entry point to the edge servers must be resilient to network failures and loss and requires the ability to route packet flows around congested and down links. Further, the packets must be delivered without significant delay and jitter, as a packet arriving too late or out-of-order is not useful in the playback. To address these concerns, the CDN may incorporate various types of information dispersal techniques that allow the data comprising a given stream to be delivered effectively. According to one such technique, the data is transmitted on multiple redundant paths to enable a given edge server to construct a clean copy of the stream when some of the paths are down or lossy.

The implementation and management of a global distributed network (e.g., such as an ICDN) is a complex, costly and difficult endeavor. A large CDN, such as the CDN operated by Akamai Technologies, has over ten thousand servers operating in over one thousand networks in over 60 countries. Typically, the CDN service provider (CDNSP) does not own infrastructure (networks, buildings, etc.) on which the CDN servers run, nor does the CDNSP necessarily have the capability of administrating those servers that are often deployed throughout the world. Rather, the service provider must deploy and then remotely administer these services and applications as a virtual network overlaid on the existing (often third party owned and controlled) physical networks and data centers. The problem is exacerbated by the fact that the CDN service provider must run many different types of applications, and those applications support numerous different data types having different data transport requirements. Thus, certain types of data (e.g., local performance information, mapping directions, and the like) are small and frequent. A small amount of loss is easily tolerated and the value of a particular piece of data decays exponentially with time (i.e., new data gets produced that overrides the old one very frequently). Other types of data are more critical to the operation of the CDN, or they may control behavior that guarantees that the CDN operates appropriately within the context of the overall Internet. Such data does not change very frequently but, nevertheless, its delivery must be guaranteed by the infrastructure. Finally, certain other data is extremely voluminous and only needs to be communicated to a small set of nodes.

Given the disparate types of applications, datatypes and transport requirements, it is difficult to implement an Internet content delivery network that is scalable, reliable and that can be managed in an effective manner. The present invention addresses this need.

BRIEF SUMMARY OF THE INVENTION

The present invention is a control and communication infrastructure (CCI) for use in a wide area network wherein a plurality of interconnected machines operate a plurality of different applications having varying data transport requirements. One such environment is a content delivery network (CDN). According to the invention, machines within a wide area distributed network agree on a namespace of data objects so that all machines use the same name for a particular data object. Once agreement on the names of objects is achieved, then machines communicate with one another by publishing and subscribing to data objects in the namespace. This approach is advantageous in that a publisher of data need not know the identity of the consumers of the data a priori, and it allows the set of consumers to vary dynamically during the system's operation. Further, consumers need not be aware of the producer's identity. In addition to providing anonymous communication between producers and consumers, the control and communication infrastructure (CCI) selects an optimal transport mechanism from a set of available transport mechanisms. The infrastructure determines the appropriate communication mechanism based on the data being moved and hides the details of how the data is moved from the application using the infrastructure.

The foregoing has outlined some of the more pertinent features of the present invention. These features should be construed to be merely illustrative. Many other beneficial

DETAILED DESCRIPTION OF THE PREFERRED EMBODIMENT

Figure 1:
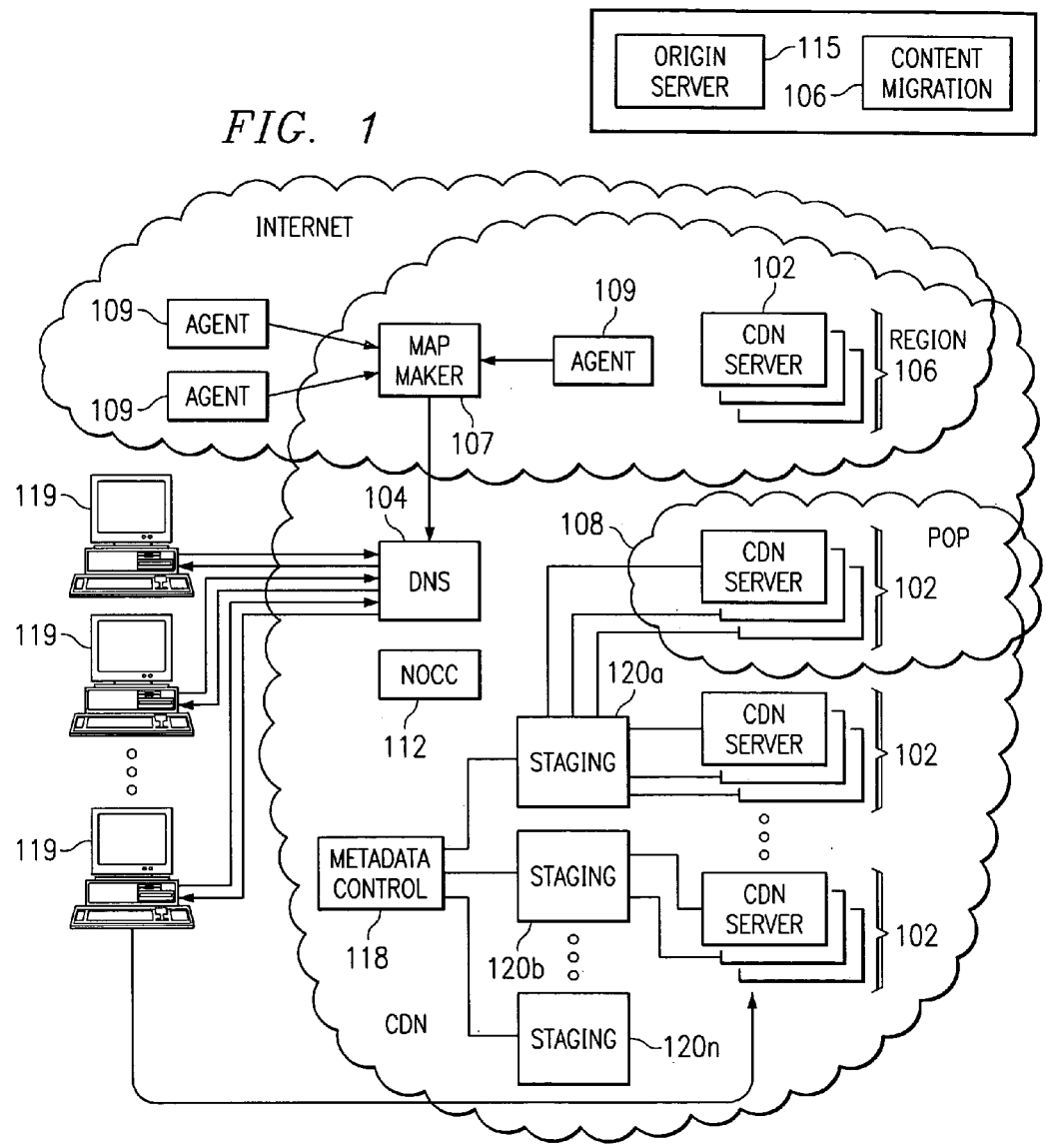
FIG. 1 is a block diagram of a known content delivery network in which the present invention may be implemented.

As seen in FIG. 1, a representative Internet content delivery infrastructure in which the present invention may be implemented usually comprises a set of "surrogate" origin servers 102 that are located at strategic locations (e.g., Internet network access points, and the like) for delivering copies of content to requesting end users 119. The request-routing mechanism 104 allocates servers 102 in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. A CDN service provider (CDNSP) may organize sets of surrogate origin servers as a "region." In this type of arrangement, a CDN region 106 typically comprises a set of one or more content servers that share a common backend, e.g., a LAN, and that are located at or near an Internet access point. Thus, for example, a typical CDN region may be co-located within an Internet Service Provider (ISP) Point of Presence (PoP) 108. A representative CDN content server is a Pentium-based caching appliance running an operating system (e.g., Linux, Windows NT, Windows 2000) and having suitable RAM and disk storage for CDN applications and content delivery network content (e.g., HTTP content, streaming media and applications). Such content servers are sometimes referred to as "edge" servers as they are located at or near the so-called outer reach or "edges" of the Internet. The CDN typically also includes network agents 109 that monitor the network as well as the server loads. These network agents are typically co-located at third party data centers or other locations. Map maker software 107 receives data generated from the network agents and periodically creates maps that dynamically associate IP addresses (e.g., the IP addresses of client-side local name servers) with the CDN regions. In one type of service offering, available from Akamai Technologies, Inc. of Cambridge, Mass., content is tagged for delivery from the CDN using a content migrator or rewrite tool 106 operated, for example, at a participating content provider server. Tool 106 rewrites embedded object URLs to point to the CDNSP domain. A request for tagged content is resolved through a CDNSP-managed DNS to identify a "best" region, and then to identify an edge server within the region that is not overloaded and that is likely to host the requested content. Instead of using content provider-side migration (e.g., using the tool 106), a participating content provider may simply direct the CDNSP to serve an entire domain (or subdomain) by a DNS directive. The CDNSP may provide object-specific metadata to the CDN content servers to determine how the CDN content servers will handle a request for an object being served by the CDN. Metadata, as used herein, thus refers to the set of all control options and parameters for the object (e.g., coherence information, origin server identity information, load balancing information, customer code, other control codes, etc.), and such information may be provided to the CDN content servers via a configuration file, in HTTP headers, or in other ways. A configuration file is advantageous as it enables a change in the metadata to apply to an entire domain, to any set of directories, or to any set of file extensions. In one approach, the CDNSP may operate a given transport mechanism, such as transport system 116, comprising a set of one or more servers, to enable metadata to be provided to the CDNSP content servers. The system 116 may comprise at least one control server 118, and one or more staging servers 120a–n, each of which is typically an HTTP server (e.g., Apache). Metadata is provided to the control server 118 by the CDNSP or the content provider (e.g., using a secure extranet application) and periodically delivered to the staging servers 120a–n. The staging servers deliver the metadata to the CDN content servers as necessary.

Figure 2:
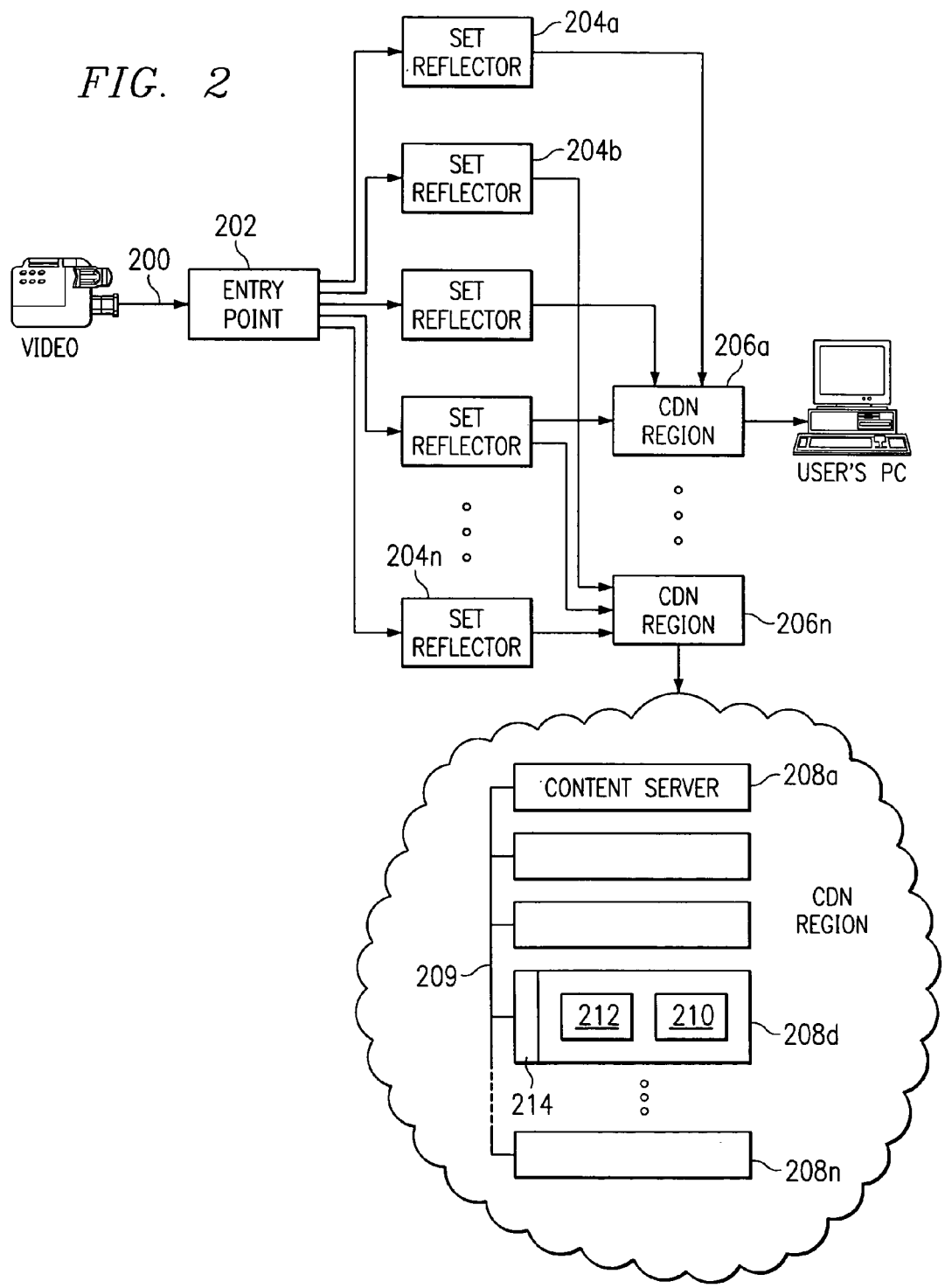
FIG. 2 is a block diagram illustrating a reflector transport network that may also be implemented in the CDN.

As described above, the Internet CDN may also provide live and on-demand streaming media. In one approach, the CDN incorporates an information dispersal technique that allows the data comprising a given stream to be sent on multiple redundant paths when required to enable a given edge server to construct a clean copy of the stream when some of the paths are down or lossy. FIG. 2 illustrates the use of a so-called "reflector" transport network that implements such a process. This network is described, for example, in U.S. Pat. No. 6,751,673.

As seen in FIG. 2, a broadcast stream 200 is sent to a CDN entry point 202. An entry point, for example, comprises two servers (for redundancy), and each server can handle many streams from multiple content providers. Once the entry point receives the stream, it rebroadcasts copies of the stream to set reflectors 204a–n. The streams are multiplexed and delivered to the set reflectors preferably via UDP (e.g., WMT encapsulated in RTSP encapsulated in UDP over IP). These set reflectors are preferably diverse from a network and geographic standpoint (e.g., at diverse Internet backbone data centers) to ensure fault tolerance. Each set reflector, in turn, rebroadcasts its copy of the stream to each subscribing region, e.g., region 206d, of a set of regions 206a–n. A subscribing region 206d is a CDN region that contains one or more streaming edge nodes 208a–n to which user(s) have been routed by the CDN request-routing mechanism. In other words, set reflectors send their streams to every edge region where they are needed. A CDN region, in this example, includes a set of edge nodes connected by a common backbone 209, e.g., a local area network (LAN). Typically, an edge node, e.g., node 208d, comprises a streaming server 212 and it may include a cache 210. A representative server runs an Intel processor, the Linux operating system and a Real Media or QuickTime Server. For Windows-based platforms, a representative server runs an Intel processor, Windows NT or 2000, and a Windows Media Server. As will be described, the edge node also runs control programs 214 to facilitate the inventive subscription mechanism.

Figure 3:
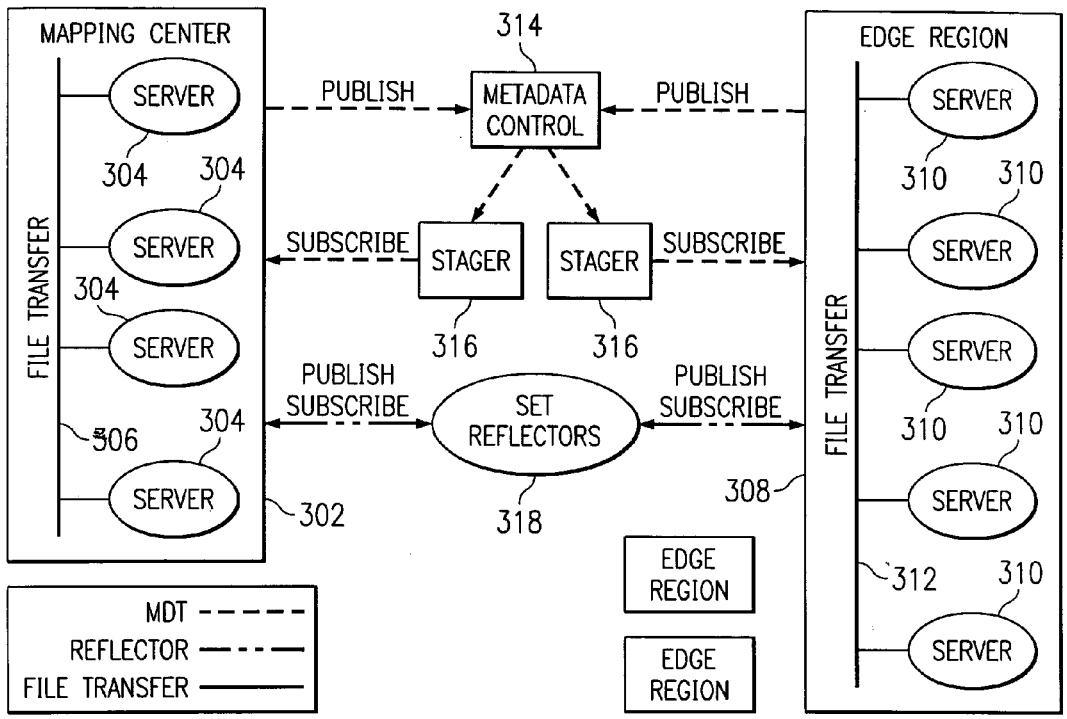
FIG. 3 is a simplified block diagram illustrating various CDN transport mechanisms that are managed by the control and communications infrastructure of the present invention.

As can be seen, a CDN comprises many machines interconnected across a wide area network running many different types of applications (e.g., data collection, mapping, and the like). These different applications export or import different types of data over different types of transport mechanisms. FIG. 3 illustrates a portion of the CDN showing the various transport mechanisms. As seen in FIG. 3, a given mapping center 302 (and there are usually many such centers) includes a number of servers 304 that are interconnected via a LAN 306. Likewise, an edge region 308 includes a number of servers 310 interconnected by LAN 312. Data transport between these machines requires a reliable, point-to-point data mover. As also indicated in FIG. 3, data aggregated by the mapping center 302 or the given edge region 308 is published to other parts of the CDN, typically by a transport mechanism that includes the metadata control server 314 and the stagers 316. Data transport in this scenario requires a reliable, scalable, multi-consumer data mover. Finally, as indicated in FIG. 3, data transfer must also be sent to the mapping center 302 or the edge region 308, and such transfer may be carried out using the set reflector transport mechanism 318. The reflector mechanism 318, as compared to the others described above, may be described as an unreliable, best effort packet mover. Thus, for illustrative purposes only, it is assumed that the wide area network has a plurality of underlying transport mechanisms including: a reliable point-to-point data mover, a reliable, scalable, multi-consumer data mover, and an unreliable, best effort packet mover.

The present invention is a control and communication infrastructure (CCI) for use in managing the communication of such varying data over such different transport mechanisms in a distributed network such as a CDN. The infrastructure exports a uniform application programming interface (API) for a set of underlying data transport mechanisms that are used by the various applications that comprise the CDN. These applications process different data types and have differing requirements for data transport. Each such application uses the CCI (through the API) to instantiate and implement a data transfer, without particular knowledge of data consumers or producers, as the case may be, and the CCI determines the actual transport mechanism to use. The actual data transport is then carried out under the control of the CCI, without the application's knowledge as to how that transport is accomplished (or by what means).

Figure 4:
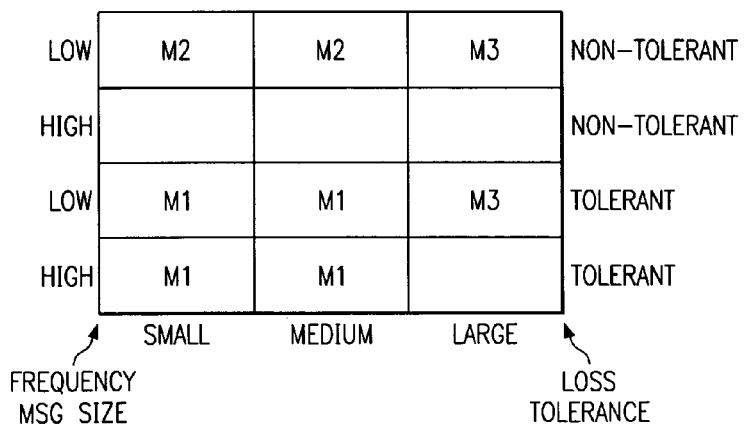
FIG. 4 is a graphical representation illustrating how the CCI daemon selects an appropriate transport mechanism as a function of the data being communicated.

FIG. 4 illustrates how CCI makes a determination of which underlying transport mechanism to use for the required data transport. As seen in this figure, CCI (and, in particular, the CCI daemon) makes a determination based on the size of the data in question, but also taking into consideration the frequency and loss tolerance of the type of transport involved. Thus, if the size of the data being communicated is small but the data must be delivered frequently with some tolerance for loss, the unreliable, best effort packet mover mechanism may be used. On the contrary, if the size of the data being communicated is small but the data must be delivered with relatively low frequency and with little tolerance for loss, the reliable, scalable, multi-consumer data mover mechanism is used. The preferred mechanisms for data having the size, frequency and loss tolerance metrics are illustrated in the graph. Where no mechanism is identified, preferably such transport is not carried out for cost or other reasons.

Thus, with respect to the various datatypes and transport requirements, the CDN, in effect, is abstracted to become a globally-distributed "shared memory," potentially over thousands of machines. The control and communications infrastructure of the invention preferably takes advantage of a "relaxed" shared memory semantic. For example, preferably each piece of data is modified only by one or a very small number of machines (referred to below as the "publishers" or "producers"). Furthermore, preferably there are only loose guarantees on the freshness of data (e.g., time-based as opposed to program-ordering based). Finally, preferably CCI need not necessarily guarantee that all readers ("subscribers" or "consumers") read the same version of data at any point in time, only that eventually (in the absence of new updates) all readers will read the same data.

Generalizing, CCI exports a whiteboard paradigm of communication. Data is placed in cells of the whiteboard by publishers and is read by subscribers. Cells preferably are named by strings while the contents of the cells are preferably arbitrary byte sequences. Generally, CCI does not know and does not attempt to interpret the content of the messages it is moving. Preferably, messages that are delivered are medium in size (e.g., 1000–1400 bytes). A message producer must specify the message length to the CCI service. CCI does not require significant CPU and bandwidth resources and may be implemented in software using off-the-shelf hardware and software.

CCI exports the relaxed shared memory paradigm to an extremely large set of cooperating machines. All machines agree on a namespace of data objects (such that all machines use the same name for a particular data object). Once agreement on the names of objects is achieved then machines can communicate with one another by publishing and subscribing to data objects in the CCI name space. The advantage of this approach is that a publisher of data need not know the identity of the consumers of the data a priori and allows the set of consumers to vary dynamically during the system's operation. Furthermore consumers need not be aware of the producer's identity. This facilitates scenarios where a particular piece of data can be produced by a multitude of machines for fault tolerance purposes but only one machine produces the data at any point in time. Such communication scenarios (i.e. varying set of consumers and varying identity of producers of data) occur quite frequently in the context of content delivery networks. Both edge machines requiring mapping information from mapping centers, and mapping centers requiring performance data from the edge can act as producers and consumers. Furthermore, to make the CDN fault tolerant, data is often consumed by a multitude of machines that can act on it, and data is produced by a collection of machines that participate in some type of leader election algorithm.

In addition to providing anonymous communication between producers and consumers CCI optimizes the communication mechanism used based on the properties of the data being communicated. Certain types of data (i.e. local performance information, and mapping directions) are small and frequent. A small amount of loss is easily tolerated and the value of a particular piece of data decays exponentially with time (i.e. new data gets produced that overrides the old one very frequently). Other types of data are more critical to the operation of the system, or control behavior that guarantees that the CDN operates effectively within the context of the overall Internet. Such data does not change very frequently but its delivery must be guaranteed by the CCI infrastructure. Finally certain data is extremely voluminous and only needs to be communicated to a small set of nodes. Preferably, CCI reuses one or more CDN communication mechanisms (e.g., the submitter mechanism and the reflector transport mechanism) for the first two types of data, and it may use a point to point messaging system for the third type. It determines the appropriate communication mechanism based on the data being moved and hides the details of how the data is moved from the applications using CCI.

CCI Detailed Design

CCI preferably comprises a daemon responsible for interfacing between the applications that want to talk to CCI and the mechanism that is responsible for the transport of messages from one node in the system to others. The daemon also determines which underlying transport mechanism to use. The inventive framework supports a publish/subscribe interface where data published on one channel will arrive at all nodes that subscribe to that channel.

1. API Definition The API calls supported by the daemon are the following: CCIClient_open, CCIClient_close, CCIClient_advertise, CCIClientunadvertise, CCIClient_subscribe, CCIClient_unsubscribe, CCIClient_characterize, CCIClient_poll, CCIClient_read, CCIClient_write, CCIClient_report, CCIClient_setresendinterval, CCIClient_typeof, CCIClient_freeMessage, CCIClient_freeMessageInfoList, CCIClient_errstr-CCI client library routines.

Synopsis include <cci/client.h>
int CCIClient_open (const char *applId, const char *hostIP, const short port);
void CCIClient_close( );
int CCIClient_advertise (const CCIMessageInfo *msgTypesP, const int numChannels);
int CCIClient_unadvertise (const CCIMessageInfo *msgTypesP, const int numChannels);
int CCIClient_subscribe (const CCIMessageInfo *msgTypesP, const int numChannels);
int CCIClient_unsubscribe (const CCIMessageInfo *msgTypesP, const int numChannels);
int CCIClient_characterize(const CCIMessageInfo type, const int options,
const SubscriberType *SubscriberList, const int num_subscribers);
int CCIClient_poll (CCIMessageInfo **messagesPP, int *numMessages);
int CCIClient_read (const CCIMessageInfo type, char **messagePP, int *lenP);
int CCIClient_write (const CCIMessageInfo type, const char *message, const int length);
int CCIClient_report(const CCIMessageInfo type);
int CCIClient_setresendinterval(const CCIMessageInfo type, const int interval_sec);
int CCIClient_typeof(CCIMessageInfo *type);
void CCIClient_freeMessage (const char *messageP);
void CCIClient_freeMessageInfoList (const CCIMessageInfo *msgInfoListP, const int numMessages);
char *CCIClient_errstr (const int errCode);
typedef struct
{
char *channel_name;
int channel_type;
} CCIMessageInfo;
typefef char *SubscriberType;

Description

CCIClient_open( ) opens a connection to a cci daemon listening on host hostIP on port port. It takes a string applId which may be used by the daemon to identify the application. The daemon must not assume that this is a universally unique identifier. The main use of this string is in logging error messages. CCIClient_open returns CCI_SUCCESS if it succeeds in connecting the daemon, and an error code if it fails. Return values include CCI_SUCCESS, CCI_E-BADMSGTYPE, CCI_ECOMMFAILURE, CCI_EREADFAILURE, CCI_EWRITEFAILURE, CCI_EPROTOMISMATCH, CCI_EINTERNAL, and CCI_EALREADYCONN. See the RETURN VALUES section for details on possible return codes.

The CCIClient_close( ) function closes the connection to the cci daemon. Furthermore, closing a connection immediately unsubscribes from all channels (assuming there are not other application subscribers) that the application closing the connection used to subscribe. An application that exits without closing its connection to the daemon preferably has no effect on the daemon's operation. Preferably, an application crash is considered the same as a close. An application that re-opens a connection preferably should make no assumption about what channels it has announced or to which it has subscribed. Possible return values include CCI_SUCCESS, CCI_EBADMSGTYPE, CCI_ECOMMFAILURE, CCI_EREADFAILURE, CCI_EWRITEFAILURE, CCI_EPROTOMISMATCH, and CCI_EINTERNAL.

The CCIClient_advertise announces to the rest of the world that this machine will be producing data on this channel from the point of announcement forward. Without an advertisement, any data produced will be dropped and will never reach any consumers. Multiple advertisements from the same machine have no ill effects. In general no two machines should advertise the same channel or be producing on the same channel during normal operation. However, if the application desired to implement fault tolerance by allowing multiple instances of itself runnning on different machines to publish on the same channel, a leader instance needs to periodically announce the channels it is producing. Periodic announcement guarantees that the leader will override secondary instance announcement and subscribers will sooner or later end up getting their data from the leader. In the presence of network partitions the system could end up having multiple producers on the same channel with different consumers getting the data from different producers. Return values include CCI_SUCCESS, CCI_EBADMSGTYPE, CCI_ECOMMFAILURE, CCI_EREADFAILURE, CCI_EWRITEFAILURE, CCI_EPROTOMISMATCH, CCI_EINTERNAL, CCI_ENOSUCHCHANNEL, and CCI_EINCOMPLETE.

The CCIClient_unadvertise cancels any previous announcement. Return values include CCI_SUCCESS, CCI_EBADMSGTYPE, CCI_ECOMMFAILURE, CCI_EREADFAILURE, CCI_EWRITEFAILURE, CCI_EPROTOMISMATCH, CCI_EINTERNAL, CCI_ENOSUCHCHANNEL, and CCI_EINCOMPLETE.

The CCIClient_subscribe( ) function allows the application to subscribe to the channels to which it would like to subscribe. The number of channels that the application wants to subscribe to is passed in numChannels. The array of channel names (array of strings) is passed in msgTypesP. Returns CCI_SUCCESS if subscription succeeds, other error code if it fails. This function is idempotent. Subscribing to a new channel requires the system to fetch the last available message from the producer of that channel. Should the producer not have such a message then nothing will be fetched. An alternative here would be to never fetch the last available message. Subscription would then only provide the subscriber with the next available message. However either can be supported depending on the needs of the application (perhaps make it a channel attribute). CCIClient_subscribe is atomic. Either it succeeds completely or fails completely. Return values include CCI_SUCCESS, CCI_EBADMSGTYPE, CCI_ECOMMFAILURE, CCI_EREADFAILURE, CCI_EWRITEFAILURE, CCI_EPROTOMISMATCH, CCI_EINTERNAL, and CCI_ENOSUCHCHANNEL.

The CCIClient_unsubscribe( ) function allows the application to unsubscribe to the channels from which it would like to unsubscribe. The number of channels that the application wants to unsubscribe to is passed in numChannels. The array of channel names (array of strings) is passed in msgTypesP. Returns CCI_SUCCESS if unsubscription succeeds, other error code if it fails. This function is also idempotent. CCIClient_unsubscribe is atomic. Either it succeeds completely or fails completely. Return values include CCI_SUCCESS, CCI_EBADMSGTYPE, CCI_ECOMMFAILURE, CCI_EREADFAILURE, CCI_EWRITEFAILURE, CCI_EPROTOMISMATCH, CCI_EINTERNAL, and CCI_ENOSUCHCHANNEL.

Thus, the CCIClient_advertise( ), CCIClient_unadvertised( ), CCIClient_subscribe( ) and CCIClient_unsubscribe( ) function calls provide the mechanism by which a given application can declare its intentions with respect to a given data object identified by a name (identified as CCI-MessageInfo). The CCIClient_advertise( ) function has no concept of the consumers who may be interested in the data and, likewise, the CCIClient_subscribe( ) function has no concept of the producers of the particular data. Once the application declares its intention to produce or consume data, as the case may be, other functions are used to effect that intent. These functions are described in more detail below.

The CCIClient_characterize( ) function allows the application to associate certain semantics with the channel. Preferably, three types of channels are supported. The first implements so-called unreliable UDP delivery (UDP). The second implements acknowledgements and can then report back to the application if the message was succesfully received by all currently subscribed recipients (UDP_ACK). Reporting back to the application preferably is done through the CCIClient_report call. Should a new subscriber join the list and the system fails to deliver an already sent message to the new subscriber, the status of the message will not change if the system thought it was succesfully delivered the first time around. However, if the message was not delivered succesfully the first time and the joining of a new subscriber triggers a succesfull message delivery, then the status of the message will change to succesfully delivered. The third type implements acknowledgements with retries (UDP_ACK_RETRY). Such channels require a static subscribers list to be associated with them (passed as a parameter in the CCIClient_characterize call). It is a CCI_EINTERNAL error for a channel with a static list of subscribers to receive acknowledgments from a machine not in the subscriber list. The system will attempt to deliver the message repeatedly until it either succeeds or the message is overwritten by a new message via the use of the CCIClient_write call. By default a channel will be deemed as UDP unless otherwise characterized. Recharacterizing a channel takes effect on the next message write. Any outstanding messages when recharacterization occurs, use the semantics of the channel when they were sent. This API call is not implemented yet. Return value is CCI_ENOTYET.

The CCIClient_poll( ) function allows the application to poll the cci daemon for all channels on which there is fresh data (messages as yet undelivered to the application) to be read. The library allocates memory to write the names of the channels and passes the ownership of the memory to the application. The application passes a pointer to a pointer messagesPP which the library initializes. The library also sets the variable numMessages with the number of channels on which there are fresh messages. Returns CCI_SUCCESS if poll succeeds, other error code if it fails. The application should call CCIClient_freeMessageInfoList( ) to free the memory allocated by the library. Return values include CCI_SUCCESS, CCI_EBADMSGTYPE, CCI_ECOMMFAILURE, CCI_EREADFAILURE, CCI_EWRITEFAILURE, CCI_EPROTOMISMATCH, and CCI_EINTERNAL.

The CCIClient_read( ) function is used by the application to read a message from a particular channel. The channel name is specified in type. The library allocates the memory needed to store the message and returns a pointer to the chunk of memory by setting the argument messagesPP. The length of the message is also returned by the library by setting the argument lenP. The application should call CCIClient_freeMessage( ) to free the memory allocated by the library. Return values include CCI_SUCCESS, CCI_EBADMSGTYPE, CCI_ECOMMFAILURE, CCI_EREADFAILURE, CCI_EWRITEFAILURE, CCI_EPROTOMISMATCH, CCI_EINTERNAL, CCI_ENOSUCHCHANNEL, and CCI_EMSGNOTRCVD.

The CCIClient_write( ) function is used by the application to write a mesage to a particular channel. The channel name is specified in type. The length of the message is specified in len and the message itself in message. Returns CCI_SUCCESS if write succeeds, other error code if it fails. Return values include CCI_SUCCESS, CCI_EBADMSGTYPE, CCI_ECOMMFAILURE, CCI_EREADFAILURE, CCI_EWRITEFAILURE, CCI_EPROTOMISMATCH, CCI_EINTERNAL, and CCI_ENOSUCHCHANNEL.

Thus, the CCIClient_read( ) and CCIClient_write( ) functions are the functions that consume or produce the data identified by the CCIClient_advertise( ) and CCIClient_subscribe( ) functions. Collectively, these functions hide the identity of producers and consumers from each other.

The CCIClient_report( ) function can be used to determine the status of a recently sent message. It can return one of four codes: MSG_IN_Q, MSG_SUCCESS, MSG_FAILED, MSG_PENDING_ACK. For UDP channels the possible codes are either MSG_IN_Q or MSG_SUCCESS. For UDP_ACK channels possible codes are MSG_IN_Q, MSG_SUCCESS, MSG_FAILED, or MSG_PENDING_ACK, while for UDP_ACK_RET channels only MSG_IN_Q, MSG_SUCCESS, and MSG_PENDING_ACK are possible. This API call is not implemented yet. Return value is CCI_ENOTYET.

The CCIClient_setresendinterval( ) function is used to set a timeout interval on a channel. The last message published on that channel will be resent periodically every interval seconds. Preferably, there is a lower bound (e.g., several minutes) on rebroadcast intervals. New messages arriving on the channel reset the timeout period. Return values include CCI_SUCCESS, CCI_EBADMSGTYPE, CCI_ECOMMFAILURE, CCI_EREADFAILURE, CCI_EWRITEFAILURE, CCI_EPROTOMISMATCH, CCI_EINTERNAL, and CCI_ENOSUCHCHANNEL.

The CCIClient_type of call returns the type of the channel passed in as a parameter. The passed parameter is used as a value/result parameter since the channel name is passed in as part of the parameter structure and the type is returned by modifying the second field of the parameter structure. Possibly types are CCI_REFLECTOR_CHANNEL, CCI_MDT_CHANNEL, and CCI_LOCAL_CHANNEL. Return values include CCI_SUCCESS, CCI_EBADMSGTYPE, CCI_ECOMMFAILURE, CCI_EREADFAILURE, CCI_EWRITEFAILURE, CCI_EPROTOMISMATCH, CCI_EINTERNAL, CCI_ENOSUCHCHANNEL, and CCI_EINCOMPLETE.

The CCIClient_freeMessageInfoList( ) function is called by the application after it is done using the message info list passed to it by the library when it called CCIClient_poll.

The CCIClient_freeMessage( ) function is called by the application after it is done using the message passed to it by the library when it called CCIClient_read.

The CCIClient_errstr( ) function converts the error code to a human readable error message. The application does not own the string returned by the library.

Return Values

Possible return values from CCI include:

CCI_SUCCESS: Success

CCI_EBADMSGTYPE: Either the client or the server generated an unknown or unexpected message type. The connection to the server will be closed and needs to be reopened. The library will attempt to reopen the connection on any CCI call so that application libraries do not have to explicitly reopen it on every error.

CCI_ECOMMFAILURE: The application experienced a communication failure with the daemon (i.e. could not set up a connection). The connection to the server will be closed (see above).

CCI_EREADFAILURE: The application experienced a read failure (could not read from the socket connected to the daemon). The connection to the server is closed.

CCI_EBADMSGLENGTH: Either the client or the server sent an incomplete message (inconsistent with the message's header information). No call returns this error code currently.

CCI_WRITEFAILURE: The application experienced a write failure (could not write from the socket connected to the daemon). The connection to the server will be closed.

CCI_EMSGNOTRCVD: The application has requested a message from a channel that has no messages. Currently the code closes the connection assuming that there is some kind of error since the application has a poll function to determine which channels have messages. Therefore asking for a message on an empty channel is considered an error that warrants closing the connection.

CCI_EPROTOMISMATCH: The application and daemon versions are not compatible. The connection will be closed.

CCI_ENOTYET: This API call is not implemented yet. The connection will remain in the same state as before the call. If it was open it remains open. If it was closed it remains closed.

CCI_EINTERNAL: The daemon/library experienced an internal error. The connection will be closed.

CCI_EALREADYCONN: The application has already connected to the daemon. Additional attempts to connect by a single application do not make sense and are flagged as errors. The connection remains open.

CCI_EINCOMPLETE: The advertisement was only partially succesfull. Some set reflectors have not received it. This error is advisory and no action is needed on behalf of the application as the daemon will attempt to recover partial advertisements by itself.

CCI_ENOSUCHCHANNEL: The channel that this operation refers to does not exist. For read operations accessing a non-existent channel implies the closing of the connection between server and client. The rational is that since reads follow polls a read on a non-existent channel indicates some serious errors. All other operations flag the error but leave the connection between client and server open.

The various routines that comprise CCI may be implemented in software running on commodity hardware.

Having described my invention, what I claim is as follows:

1. In a content delivery network having a plurality of machines that execute a set of applications having a plurality of data transport requirements, a control and communications infrastructure (CCI) embodied in one or more computer-readable storage media for use therein, comprising:

a set of underlying transport mechanisms including a reliable, point-to-point data mover, a reliable, scalable, multi-consumer data mover, and an unreliable, best effort packet mover;

an application programming interface (API) through which an application in the set of applications publishes or subscribes to a given data object, wherein the application publishes or subscribes to the given data object by identifying a name in a CCI namespace; and a daemon that selects a given one of the set of underlying transport mechanisms to transport given data associated with the given data object to a set of one or more content servers in the content delivery network, wherein the daemon selects the given one of the set of underlying transport mechanisms by trading off size of the given data, together with frequency and loss tolerance with respect to the transport of the given data, wherein transport of the given data is carried out under control of the CCI without the application's knowledge as to how the transport is accomplished.

2. The control and communications infrastructure for use in the content delivery network as described in claim 1 wherein the reliable, point-to-point data mover distributes the given data to the set of one or more servers in the content delivery network.

3. The control and communications infrastructure for use in the content delivery network as described in claim 1 wherein the reliable, scalable, multi-consumer data mover distributes the given data to the set or more servers in the content delivery network.

4. The control and communications infrastructure for use in the content delivery network as described in claim 1 wherein the unreliable, best effort packet mover distributes the given data to the set of one or more servers in the content delivery network.

5. The control and communications infrastructure for use in the content delivery network as described in claim 1 wherein the name of the given data object is a name that has been agreed upon by the set of applications.

6. The control and communications infrastructure for use in the content delivery network as described in claim 5 wherein the application publishes or subscribes to the given data object anonymously.

7. The control and communications infrastructure for use in the content delivery network as described in claim 1 wherein the namespace is a data structure shared by the set of applications.

8. The control and communications infrastructure for use in the content delivery network as described in claim 7 wherein the set of applications comprises a first application that is different from a second application.

9. A method for communicating data in a wide area network wherein a plurality of machines execute a plurality of applications having different data transport requirements, wherein the wide area network supports a set of available transport mechanisms, comprising:

isolating producers and consumers with respect to given data requiring transport in the wide area network, wherein the producers and consumers are isolated through an application programming interface (API)

through which an application of the plurality of applications publishes or subscribes to a given data object in a namespace of a control and communication infrastructure (CCI);

selecting, by the CCI, a given one of the available transport mechanisms to use to transport the given data, wherein the selection is based on given characteristics of the given data, wherein the given characteristics include size of the given data, together with frequency and loss tolerance with respect to the transport of the given data; and transporting the given data to a set of one or more servers in the wide area network using the given one of the available transport mechanisms selected by the CCI, wherein the given data is transported without the application's knowledge as to how transport is accomplished;

wherein the available transport mechanisms comprise a reliable, point-to-point data mover, a reliable, scalable, multi-consumer data mover, and an unreliable, best effort packet mover.

10. The method as described in claim 9 wherein the wide area network is a content delivery network (CDN).

11. The method as described in claim 9 wherein the application publishes or subscribes to given data object anonymously.

12. The method as described in claim 9 further including establishing an agreed name for the given data object.

13. The method as described in claim 9 wherein at least first and second applications of the plurality of applications are heterogeneous.

* * * * *